United States Patent [19]
Zheng

[11] Patent Number: 6,068,679
[45] Date of Patent: May 30, 2000

[54] PROCESS OF AND A DEVICE FOR PRODUCING A GAS, CONTAINING AT LEAST ONE COMPONENT, FROM A GAS MIXTURE

[75] Inventor: Guhong Zheng, Lidingö, Sweden

[73] Assignee: AGA Aktiebolag, Lindingo, Sweden

[21] Appl. No.: 09/142,297

[22] PCT Filed: Feb. 26, 1997

[86] PCT No.: PCT/SE97/00332

§ 371 Date: Dec. 10, 1998

§ 102(e) Date: Dec. 10, 1998

[87] PCT Pub. No.: WO97/32658

PCT Pub. Date: Sep. 12, 1997

[30] Foreign Application Priority Data

Mar. 4, 1996 [SE] Sweden .................................. 9600844

[51] Int. Cl.[7] .................................................. B01D 53/047
[52] U.S. Cl. ................................. 95/96; 95/130; 96/112; 96/130; 96/144
[58] Field of Search .................................. 95/14, 96–106, 95/117–122, 130, 138, 139; 96/112, 128, 130, 137, 143, 144, 149

[56] References Cited

U.S. PATENT DOCUMENTS

| | | | |
|---|---|---|---|
| 2,626,675 | 1/1953 | Maher ........................................ | 96/144 |
| 3,740,928 | 6/1973 | Schmid .................................. | 96/144 X |
| 3,866,428 | 2/1975 | Simonet et al. ........................ | 95/130 X |
| 4,026,680 | 5/1977 | Collins .................................... | 95/130 X |
| 4,336,042 | 6/1982 | Fraxitz et al. ......................... | 96/149 X |
| 4,354,859 | 10/1982 | Keller, II et al. ...................... | 95/130 X |
| 4,448,592 | 5/1984 | Linde ....................................... | 95/130 |
| 5,071,449 | 12/1991 | Sircar .................................... | 95/130 X |
| 5,133,784 | 7/1992 | Boudet et al. ........................ | 96/130 X |
| 5,169,413 | 12/1992 | Leavitt .................................. | 95/130 X |
| 5,176,721 | 1/1993 | Hay et al. .................................... | 95/96 |
| 5,268,022 | 12/1993 | Garrett et al. ........................ | 95/130 X |
| 5,407,465 | 4/1995 | Schaub et al. ........................ | 95/130 X |
| 5,441,559 | 8/1995 | Petit et al. ............................ | 96/144 X |
| 5,447,558 | 9/1995 | Acharya .................................. | 95/104 |
| 5,520,720 | 5/1996 | Lemcoff .................................. | 95/130 X |
| 5,520,721 | 5/1996 | Fraysse et al. ........................ | 95/130 X |
| 5,593,475 | 1/1997 | Minh ...................................... | 96/144 X |
| 5,624,477 | 4/1997 | Armond .................................. | 95/130 X |
| 5,632,804 | 5/1997 | Schartz .................................. | 95/130 X |
| 5,632,807 | 5/1997 | Tomita et al. ........................ | 96/144 X |
| 5,656,068 | 8/1997 | Smolarek et al. .................... | 95/130 X |
| 5,672,196 | 9/1997 | Acharya et al. ........................... | 95/97 |
| 5,674,311 | 10/1997 | Notaro et al. ........................ | 95/130 X |
| 5,759,242 | 6/1998 | Smolarek et al. ...................... | 96/149 |

FOREIGN PATENT DOCUMENTS

| | | | |
|---|---|---|---|
| 612553 | 8/1994 | European Pat. Off. . | |
| 66-154537 | 6/1994 | Japan ...................................... | 95/130 |
| 438266 | 4/1985 | Sweden . | |
| WO 96/04978 | 2/1996 | WIPO . | |

*Primary Examiner*—Robert H. Spitzer
*Attorney, Agent, or Firm*—Pearne, Gordon, McCoy & Granger LLP

[57] ABSTRACT

A process and apparatus for separating a gas from a gas mixture. The apparatus includes a vessel having an interior with a bed of adsorbent disposed therein. First and second passages communicate with the interior of the vessel. In a first step, the gas mixture is fed to the bed via the first passage and discharged from the bed via the second passage. In a second step, rest gas is evacuated from the bed via the first passage. In a third step, the gas mixture is fed to the bed via the second passage and discharged from the bed via the first passage. In a fourth step, rest gas is evacuated from the bed via the second passage.

28 Claims, 5 Drawing Sheets

PROCESS OF AND A DEVICE FOR PRODUCING A GAS, CONTAINING AT LEAST ONE COMPONENT, FROM A GAS MIXTURE

TECHNICAL FIELD OF THE INVENTION AND PRIOR ART

The present invention relates to a process of separating a gas, containing at least one component, from a gas mixture.

bed has been observed. The molecular sieve particles used for oxygen production have an optimum temperature where they give the best performance. The temperature gradient may lead to a non optimum performance of the process.

One such known conventional PSA-process for oxygen production features two adsorption vessels (A and B) and a full cycle involving the following steps disclosed in TABLE 1:

TABLE 1

| Step | Vessel A | Vessel B |
|---|---|---|
| 1 | Air feed to vessel inlet and oxygen production via vessel outlet to receiver | Regeneration by evacuation of waste through the vesset inlet |
| 2 | Air feed to vessel inlet and oxygen production via vessel outlet to receiver and for purge to vessel B | Regeneration by evacuation of waste through the vessel inlet and oxygen purge via vesset outlet |
| 3 | Pressure equalisation. vessel A gives oxygen via vessel outlet to vessel B | Pressure equalisation, vessel B receives oxygen via vessel outlet from vessel A |
| 4 | Regeneration by evacuation of waste through the vessel inlet | Air feed to vessel inlet and oxygen production via vessel outlet to receiver |
| 5 | Regeneration by evacuation of waste through the vessel inlet and oxygen purge via vessel outlet | Air feed to vessel inlet and oxygen production via vessel outlet to receiver and for purge to vessel A |
| 6 | Pressure equalisation. vessel A receives oxygen via vessel outlet from vessel B | Pressure equalisation. vessel B gives oxygen via vessel outlet to vessel A |

Moreover, the present invention relates to a device for separating a gas, containing at least one component, from a gas mixture.

It is known to produce gases, such as oxygen and nitrogen, by the separation of air. Furthermore, it is known to provide such a separation by means of a so called PSA-process (Pressure Swing Adsorption). A conventional PSA-process uses one or more adsorption beds containing an adsorbent provided in one or more layers. Typically, the adsorbent comprises molecular sieve particles having a size of 1–3 mm. Thus, such a PSA-process may produce oxygen by pressurising air through the adsorbing bed where nitrogen can be selectively adsorbed and being removed from the adsorbing bed by de-pressurization. There are several different processes based on this principle described in patents and literature. All these processes have the common feature that the adsorption part of the process cycle is performed at a higher pressure while the desorption (regeneration) part of the cycle is made at lower pressure.

Ideally, such a process should be run under an isothermal condition. However, in practice the temperature in the adsorption bed is not constant but varies both during the various steps of the cycle and from one point to another within the adsorption bed. Typically, the molecular sieve particles are heated during the adsorption phase, which influences the adsorption efficiency negatively, and cooled down during the desorption (regeneration), which influences the desorption efficiency negatively. Furthermore, it has been demonstrated by practical experiments on conventional processes that the adsorption bed develops a temperature gradient after some hours of operation. The gradient is such that the bed is colder in the feed end and warmer in the product end. Some 50° C. temperature difference across the

SUMMARY OF THE INVENTION

The object of the present invention is to improve the efficiency of a process and a device for the separation of gases. More particular, the object is to prevent the development of a temperature gradient in the separation bed and thereby enable more appropriate conditions for the process such that its overall performance may be enhanced.

This object is obtained by means of a process, in which the steps of operation are essentially the same for the same purpose as in the conventional process as described above, but wherein the direction of the gas flows are reversed every other cycle. As a result of the reversal of the gas flow in the different steps of operation of the process the development of a temperature gradient in an adsorption beds is effectively avoided. The process temperature can therefore be maintained on an equal level throughout the bed, thereby providing the same process conditions for the whole of the bed.

According to an embodiment of the present invention, there is provided a second vessel having a first passage, a second passage and a bed within the second vessel, wherein the first step also comprises evacuating the rest gas from the bed of the second vessel via its first passage, the second step also comprises feeding the gas mixture to the bed of the second vessel via its second passage and discharging said gas from the bed of the second vessel via its first passage, the third step also comprises evacuating the rest gas from the bed of the second vessel via its second passage, and the fourth step also comprises feeding the gas mixture to the bed of the second vessel via its first passage and discharging said gas from the bed of the second vessel via its second passage. By means of a process involving two such separation vessels the overall efficiency may be enhanced, e.g. by simultaneous adsorption and regeneration. Furthermore, during an intermediate phase of the first and third steps said gas discharged from the bed of the first vessel is partly transferred to the bed of the second vessel, and during an intermediate phase of the second and fourth steps said gas discharged from the bed of the second vessel is partly transferred to the bed of the first vessel. By such transfer from one vessel to another, the higher content of said gas than in the gas mixture may be utilized during the next adsorption step of the other vessel. Thereby, said intermediate phase of the first step may comprise transferring said gas from the bed of the first vessel via its second passage to the bed of the second vessel via its second passage, said intermediate phase of the second step may comprise transferring said gas from the bed of the second vessel via its first passage to the bed of the first vessel via its second passage, said intermediate phase of the third step may comprise transferring said gas from the bed of the first vessel via its first passage to the bed of the second vessel via its first passage, and said intermediate phase of the fourth step may comprise transferring said gas from the bed of the second vessel via its second passage to the bed of the first vessel via its first passage. Furthermore, each step may be terminated by an end phase comprising pressure equalization between the first and second vessel.

According to a further embodiment of the invention, the feeding of the gas mixture to the bed comprises adsorption of the rest gas by means of an adsorbent contained in the bed. Thereby, the adsorbent comprises a particulate material, such as molecular sieve particles.

According to a further embodiment of the invention, the gas mixture is air, said gas being essentially oxygen and said rest gas being essentially nitrogen.

According to a further embodiment the temperature of the gas mixture to be fed to the separation vessel is regulated so that an optimal temperature level is maintained in the bed. Thus, the bed temperature may be set to match the optimum for the selected separation process, e.g. depending on the type of molecular sieves used, by setting a proper temperature of the gas mixture.

Furthermore, the above object is obtained a device having second conduit means provided to connect the source means to the bed via the second passage and the bed via the first passage to the receiving means, whereby the development of a temperature gradient in the separation bed of the vessel may be avoided and it is possible to operate an adsorption process and regeneration process at an appropriate temperature.

According to one advantageous embodiment of the invention a second separation vessel is provided having a first passage, a second passage and a separation bed within the second vessel, wherein fifth conduit means is provided to connect the source means to the bed of the second vessel via its second passage and the bed of the second vessel to the receiving means via its first passage, and sixth conduit means to connect the source means to the bed of the second vessel via its first passage and the bed of the second vessel to the receiving means via its second passage.

According to another advantageous embodiment of the invention, the source means comprises a pump device to supply the gas mixture to the bed so that a relatively high pressure, preferably above the atmospheric level, is reached in the bed. Thereby, the second receiving means may comprise a vacuum pump device provided to evacuate the rest gas from the bed such that a relatively low pressure, preferably below the atmospheric level, is reached in the bed.

According to a further advantageous embodiment of the invention, the first and second passages and the separation bed of the vessel is symmetrically provided with respect to a midplane of the vessel. To provide an efficient gas flow in two reversed directions through the bed, the adsorption bed and the interconnecting inlet/outlet passages are fully mirror symmetric, which means that the bed has no specific inlet or outlet ends. Thereby, according to one embodiment of the invention, the vessel has an essentially circular cylindrical shape around a centre axis, the first passage is provided in the cylindrical wall of the vessel, the second passage is provided in the cylindrical wall of the vessel on a diametrically opposite part thereof, the bed is enclosed by enclosure means comprising a first and second enclosure panel provided inside the first and second passage, respectively, at a distance therefrom to provide a flow distribution space therebetween and being perforated to permit fluid flow therethrough, and that each of said enclosure panel has an outer surface which is essentially parallel with the centre axis and convex seen from the respective passage. Such a convex enclosure panel demonstrates a high strength and stability in comparison with a plane panel. Thus, the enclosure panel may be constructed in a simple and cost efficient manner, since no support structure is needed for such a curved panel whereas a plane panel requires a very rigid support structure in order to avoid bending and/or vibration due to the pressure from the flowing process gas. With such a convex, curved plate the forces acting on the plate will be transformed to essentially membrane stresses in the panel. Furthermore, by means of a convex enclosure panel it is possible to compensate for the fact that the gas flowing in the middle of the bed will pass faster therethrough than the gas flowing closer to the cylindrical walls of the vessel. This means that gas flow will demonstrate an essentially plane front configuration, and therefore all parts of the bed will be uniformly utilized during the adsorption process. Moreover by means of convex enclosure panels, it is possible to increase the amount of particulate material in the bed, since the empty space in the cylindrical vessel is reduced in comparison with the plane enclosure panels previously known. Thereby, the efficiency of the process may be further improved.

According to a further advantageous embodiment of the invention, the enclosure means comprises a flexible end wall provided to be forced against the particulate material in order to maintain said material in a substantially motionless position. Thereby, the cylindrical vessel may comprise an end wall, the flexible end wall being provided inside the end wall of the vessel at a distance therefrom to provide a closed space therebetween. By pressure regulating means provided the pressure in said closed space may be regulated such that the particulate material within the enclosure means is maintained in said substantially motionless position. Hence, it is possible to increase the gas flow rate through the bed and still keep the particulate material in a fixed position therein. Since the flexible end wall is movable, it will automatically follow as the particulate material becomes more compact and is sinking in the bed, which normally occurs during the initial period of operation of the process.

According to a further advantageous embodiment of the invention, the centre axis is directed in a substantially vertical orientation. For such a vertical vessel in which the gas flow is horizontally directed the limiting dimension is the diameter of the cylindrical vessel. The height of the vessel is merely limited by the handling aspects. Thus, such a vessel may have a considerable size.

BRIEF DESCRIPTION OF THE DRAWINGS

The present invention will now be explained in more detail in connection with the description of an embodiment thereof and with reference to the accompanying drawings, in which.

DETAILED DESCRIPTION OF VARIOUS EMBODIMENTS OF THE PRESENT INVENTION

Figure 1:
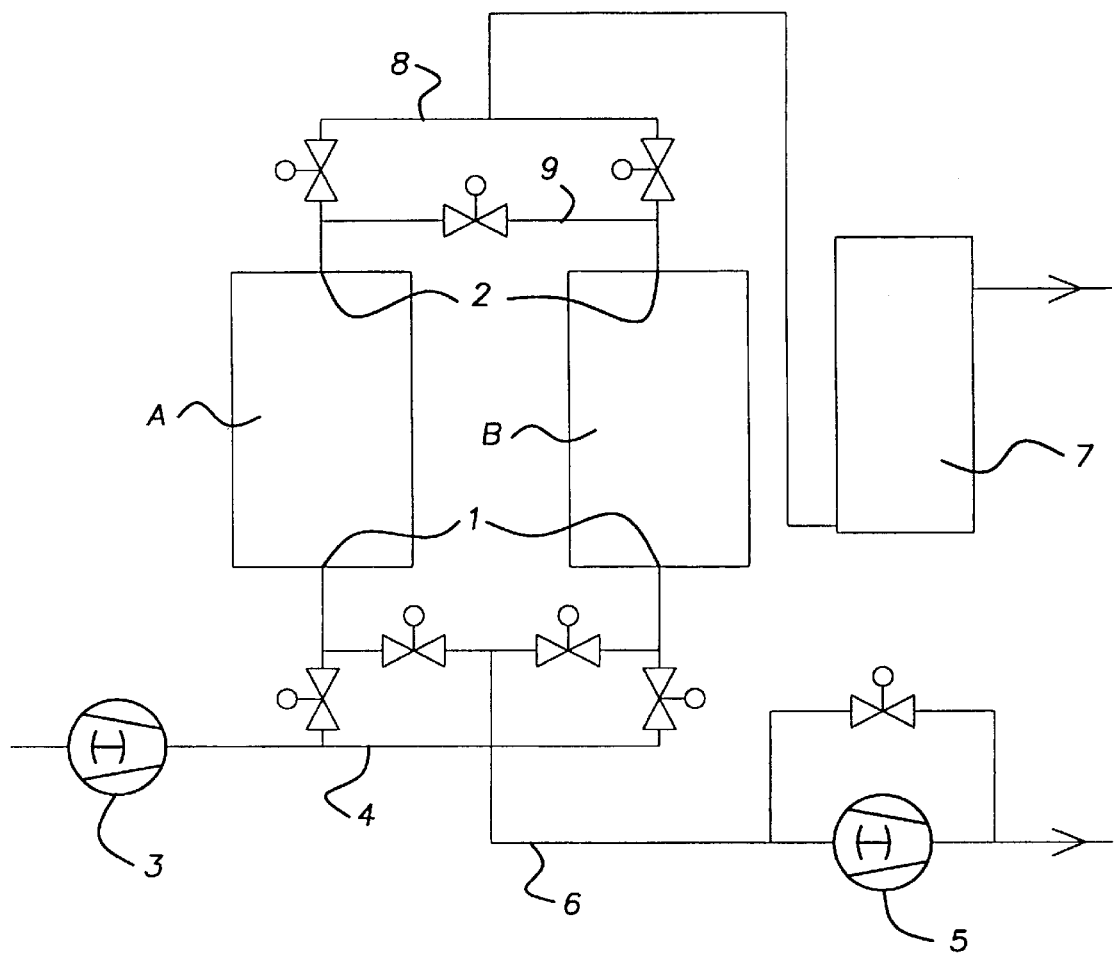
FIG. 1 is a schematical diagram of a separation process according to the prior art.

With reference to FIG. 1, a device for PSA-process (pressure swing adsorption) according to the prior art is described. The device comprises two vessels A and B, each enclosing a bed of adsorbent, such as molecular sieves particles. Each vessel A, B is provided with an inlet passage 1 and an outlet passage 2. The inlet passages 1 are connected to a pump 3 via conduit means 4 and to a vacuum pump 5 via conduit means 6. The outlet passages 2 are connected to a receiving means 7 via conduit means 8. A further conduit means 9 is provided between the outlet passages 2 of the vessels A and B. During a first step of operation air is fed by means of the pump 3 to the bed of the vessel A through the inlet passage 1. Thereby, a relatively high pressure level is reached in the bed of the vessel A and thus the nitrogen in the air is adsorbed by the adsorbent and oxygen enriched gases pass through the bed and exit from the vessel A through the outlet passage 2. The oxygen enriched gases are transferred to the oxygen receiving means 7. Moreover, during the first step of operation the adsorbent in the vessel B is regenerated by evacuating the rest gases through the inlet passage 1 by means of the vacuum pump 5. During a second step of operation air is still fed to the vessel A and the oxygen enriched gases are supplied through the outlet passage 2 to the receiving means 7 and to the vessel B through its outlet passage 2 for purging. Rest gases are still evacuated from the vessel B. During a third step of operation a pressure equalization between the vessels A and B takes place by transferring oxygen enriched gases through the conduit means 9 and the respective outlet passages 2. A fourth, fifth and sixth step of operation corresponds to the first, second and third step of operation, respectively, except for the fact that the vessel B is supplied with air and the vessel A is regenerated.

Figure 2:
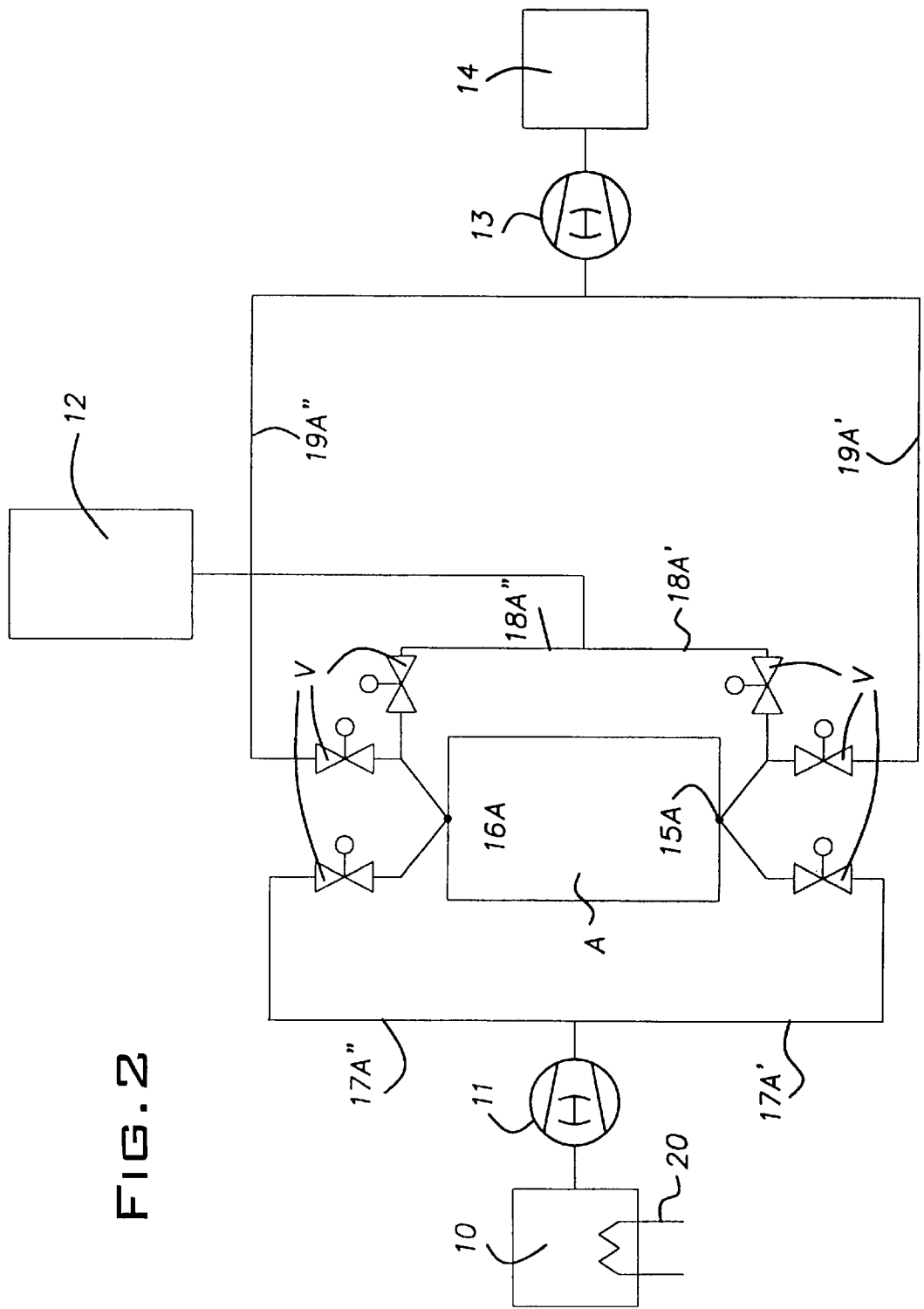
FIG. 2 is a schematical diagram of a separation device according to a first embodiment of the present invention.

FIG. 2 discloses a separation device according to a first embodiment of the present invention. The device, being a pressure swing adsorption apparatus, comprises a source means 10, a pump 11, a vessel A, a product gas receiving means 12, a vacuum pump 13, and a second, rest gas receiving means 14. The source means 10 may be in the form of a container or an inlet device, e.g. in the case of separation of air. The product gas receiving means 12 may be in the form of a container or a pipe means leading directly to a process using the gas produced by the separation device. The second, rest gas receiving means 14 may be in the form of a container or an outlet device leading to the ambient atmosphere. The vessel A is provided with a bed of adsorbing material, such as molecular sieves particles, e.g. in the form of zeolite, a first inlet/outlet passage 15A and a second inlet/outlet passage 16A. This means that gas may be fed through the vessel A in two directions, i.e. a first direction via the first passage 15A, the bed and the second passage 16A and a second direction via the second passage 16A. the bed and the first passage 15A. Thus, the separation vessel A is symmetrical with respect to the passages and a midplane of the vessel and its bed. One example of the construction of such symmetrical vessel will be more closely described further below.

The separation device comprises a conduit 17A', connecting the source means 10 to the first passage 15A of the vessel A, a conduit 18A", connecting the second passage 16A of the vessel A to the product gas receiving means 12, a conduit 17A", connecting the source means 10 to the second passage 16A of the vessel A, and a conduit 18A', connecting the first passage 15A of the vessel A to the product gas receiving means 12. Moreover, there is a conduit 19A', connecting the first passage 15A of the vessel A to the second, rest gas receiving means 14, and a conduit 19A", connecting the second passage 16A of the vessel A to the second, rest gas receiving means 14. Each of the conduits 17A', 18A', 19A', 17A", 18A", and 19A" is provided with its respective valve means V. Furthermore, the source means 10 comprises a temperature regulating device 20 provided to maintain the gas temperature to the vessel A so that the adsorption process may take place under the optimal conditions.

The function of the first embodiment will now be explained with reference to the production, by way of example only, of oxygen by the separation of air. During a first step of operation air is fed by the pump 11 from the source means 10 via the conduit 17A' to the first passage 15A. Thereby, the valve means V of the conduits 17A' and 18A" are open and the other valve means V are closed. Air is pressurized into the bed of the vessel A by the pump 11 to a relatively high pressure. typically above the atmospheric level, thereby loosing an essential part of its nitrogen content being adsorded by the molecular sieves particles in the bed. By means of the temperature regulating device 20, the temperature of the air may be controlled at an optimal level. Thus, oxygen enriched gases will be produced and forced out of the vessel A through the second passage 16A and via the conduit 18A" to the product receiving means 12.

During a second step of operation, the adsorbing material of the vessel A is regenerated. Thereby, the valve means V of the conduit 19A" is open and all other valve means V are closed, and the vacuum pump 13 will reduce the pressure in the vessel A and thereby evacuate a rest gas, containing essentially nitrogen and minor residual components, from the vessel A and discharge the rest gases to the second, rest gas receiving means or ambient air 14.

During a third step of operation air is fed by the pump 11 from the source means 10 via the conduit 17A" to the second passage 16A. Thereby, the valve means V of the conduits 17A" and 18A' are open and the other valve means V are closed. By means of the temperature regulating device 20, the temperature of the air will be maintained at an optimal level. The air will be forced through the bed of the vessel A and the oxygen enriched gases produced will be forced out of the vessel A through the first passage 15A and via the conduit 18A' to the product receiving means 12.

During a fourth step of operation, the adsorbing material of the vessel A is again regenerated. Thereby, the valve means V of the conduit 19A" is open and all other valve means V are closed, and the vacuum pump 13 will reduce the pressure in the vessel A and thereby evacuate the rest gas from the vessel A and discharge it to the second, rest gas receiving means or ambient air 14. After the fourth step of operation the process repeats the first to fourth steps of operation.

Consequently, the tendency to the development of a temperature gradient in the vessel A is effectively avoided, since the "feed end" (the cold spot) and the "product end" (the hot spot) during the first and second steps of operation reverses during the third and fourth steps of operation.

Figure 3:
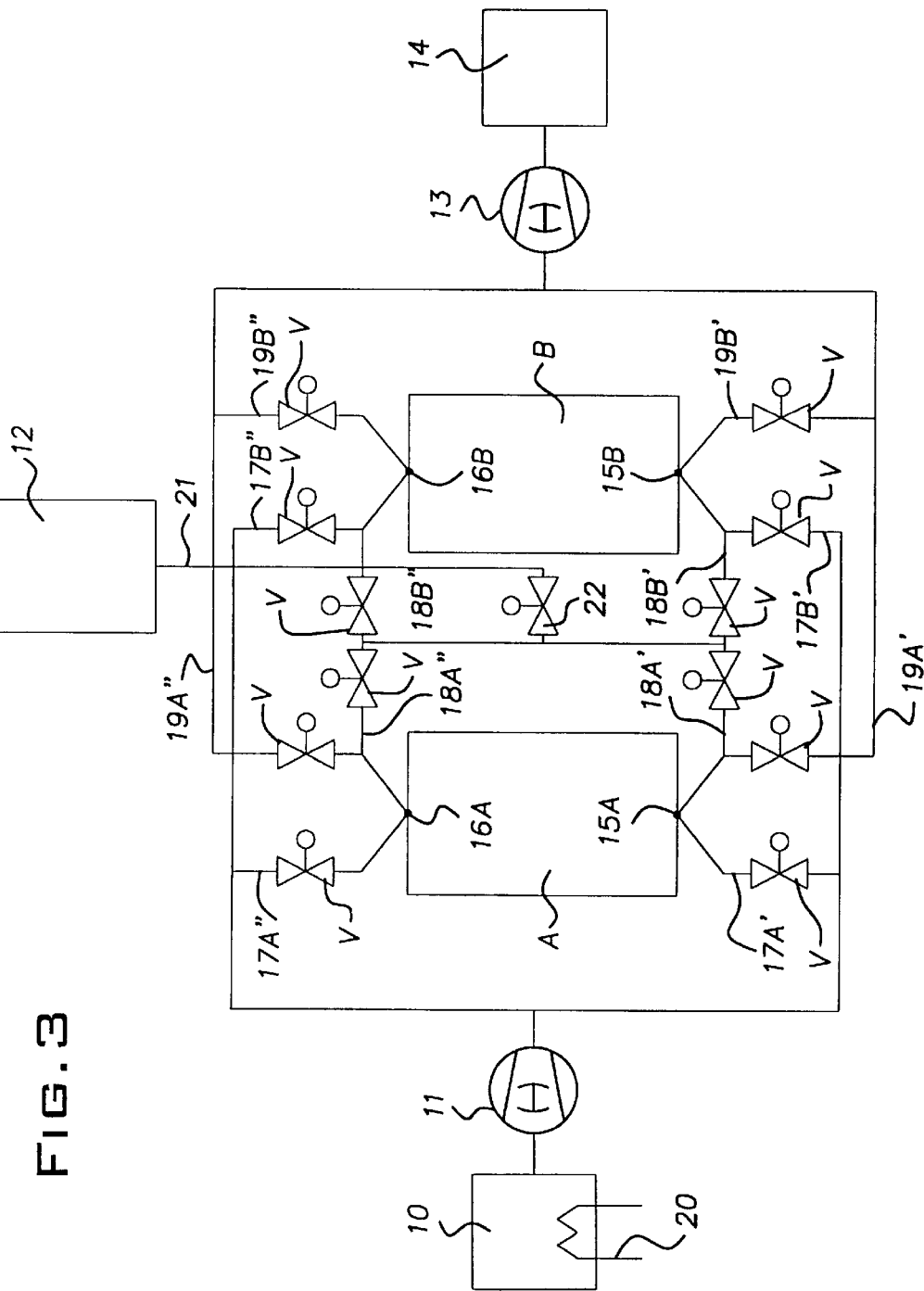
FIG. 3 is a schematical diagram of a separation device according to a second embodiment of the present invention.

FIG. 3 discloses a separation device according to a second embodiment of the present invention. Also the second embodiment refers to a pressure swing adsorption apparatus. This second embodiment differs from the first embodiment in that two separation vessels A and B have been provided. These two vessels A and B are essentially identical and have the same configuration as the vessel A in the first embodiment. Parts, such as the source means 10, the pump 11, the product receiving means 12, the vacuum pump 13, the second, rest gas receiving means 14, and the temperature regulating device 20 are essentially the same and therefore do not need to be explained again. Furthermore, it should be noted that elements of this second embodiment having the same function as corresponding elements in the first embodiment disclosed in FIG. 2 have the same reference signs. The vessel B comprises a first passage 15B and a second passage 16B, which correspond to the first and second passages 15A and 16A, respectively, of the vessel A. The vessel B is connected to the source means 10, the product receiving means 12 and the second, rest gas receiving means 14 by conduits 17B', 18B', 19B', 17B", 18B", and 19B", which correspond to the conduits 17A', 18A', 19A', 17A", 18A", and 19A", respectively, provided for the vessel A. The conduits 17A', 18A', 19A', 17A", 18A", and 19A" are provided with their respective valve means V. Furthermore, an inlet pipe 21 of the receiving means 12 is provided with valve 22.

The function of the second embodiment will now be explained with reference to the production, by way of example only, of oxygen by separation of air, cf. also TABLE 2 below.

During the first step of operation, comprising adsorption by the vessel A, as described above in connection with the first embodiment, the vessel B is regenerated by evacuation of the rest gas through the first passage 15B. During an intermediate phase of the first step of operation the valve means V of the conduits 18A" and 18B" are open as well as the valve 22 of the conduit 21, thereby permitting both oxygen purge from the vessel A to the vessel B via the second passages 16A and 16B as well as oxygen supply from the vessel A to the product gas receiving means 12. During an end phase of the first step of operation, the valve 22 of the conduit 21 is then closed, thereby permitting pressure equalisation between the vessels A and B via the second passages 16A and 16B and the conduits 18A" and 18B". During this end phase the valve means V of the conduit 17A" is closed and no air is supplied to the vessel A.

During the second step of operation, comprising regeneration of the vessel A, as described above in connection with the first embodiment, air is supplied to the vessel B via the conduit 17B" and the second passage 16B. During an intermediate phase of the second step of operation the valve means V of the conduits 18A" and 18B' are open as well as the valve 22 of the conduit 21, thereby permitting both oxygen purge from the vessel B to the vessel A via the first passage 15B and the second passage 16A as well as oxygen supply from the vessel B to the product gas receiving means 12. During an end phase of the second step of operation, the valve 22 of the conduit 21 is closed, thereby permitting pressure equalization between the vessels B and A via the first passage 15B and the second passage 16A and the conduits 18B' and 18A". During this end phase the valve means of the conduit 17B" is closed and no air is supplied to vessel B.

During the third step of operation, comprising adsorption by the vessel A as described above in connection with the first embodiment, the vessel B is regenerated by evacuation of the rest gas through the second passage 16B. During an intermediate phase of the third step of operation, the valve means V of the conduits 18A' and 18B' are open as well as the valve 22 of the conduit 21, thereby permitting both oxygen purge from vessel A to vessel B via the first passages 15A and 15B as well as oxygen supply from the vessel A to the product gas receiving means 12. During an end phase of the third step of operation, the valve 22 of the conduit 21 is closed, thereby permitting pressure equalization between the vessels A and B via the first passages 15A and 15B and the conduits 18A' and 18B'. During this end phase the valve means V of the conduit 17A" is closed and no air is supplied to vessel A.

During the fourth step of operation, comprising regeneration of the vessel A, as described above in connection with the first embodiment, air is supplied to the vessel B through the first passage 15B. During an intermediate phase of the fourth step of operation the valve means V of the conduits 18A' and 18B" are open as well as the valve 22 of the conduit 21, thereby permitting both oxygen purge from the vessel B to the vessel A via the second passage 16B and the first passage 15A as well as oxygen supply from the vessel B to the product gas receiving means 12. During an end phase of the first step of operation, the valve 22 of the conduit 21 is closed, thereby permitting pressure equalization between the vessels B and A via the second passage 16B and the first passage 15A and the conduits 18B" and 18A". During this end phase the valve means V of the conduit 17B' is closed and thus no air is supplied to vessel B.

After the fourth step of operation the process repeats from the first to the fourth step of operation. Also in this second embodiment, the tendency to the development of a temperature gradient in the vessels A and B is effectively avoided, since the product end in the first and second steps of operation will be the feed end in the third and fourth steps of operation.

TABLE 2

| Step | Phase | Vessel A | Vessel B |
|---|---|---|---|
| 1 | main | Air feed to 15A and oxygen production via 16A to receiver | Regeneration by evacuation of waste through the 15B |
| 1 | intermediate | Air feed to 15A and oxygen production via 16A to receiver and for purge to vessel B | Regeneration by evacuation of waste through the 15B and oxygen purge via 16B |

TABLE 2-continued

| Step | Phase | Vessel A | Vessel B |
|---|---|---|---|
| 1 | end | Pressure equalisation. vessel A gives oxygen via 16A to vessel B | Pressure equalisation. vessel B receives oxygen via 16B from vessel A |
| 2 | main | Regeneration by evacuation of waste through the 15A | Air feed to 16B and oxygen production via 15B to receiver |
| 2 | intermediate | Regeneration by evacuation of waste through the 15A and oxygen purge via 16A | Air feed to 16B and oxygen production via 15B to receiver and for purge to vessel A |
| 2 | end | Pressure equalisation. vessel A receives oxygen via 16A from vessel B | Pressure equalisation. vessel B gives oxygen via 15B to vessel A |
| 3 | main | Air feed to 16A and oxygen production via 15A to receiver | Regeneration by evacuation of waste through the 16B |
| 3 | intermediate | Air feed to 16A and oxygen production via 15A to receiver and for purge to vessel B | Regeneration by evacuation of waste through the 16B and oxygen purqe via 15B |
| 3 | end | Pressure equalisation. vessel A gives oxygen via 15A to vessel B | Pressure equalisation. vessel B receives oxygen via 15B from vessel A |
| 4 | main | Regeneration by evacuation of waste through the 16A | Air feed to 15B and oxygen production via 16B to receiver |
| 4 | intermediate | Regeneratlon by evacuation of waste through the 16A and oxygen purge via 15A | Air feed to 15B and Oxygen production via 16B to receiver and for purge to vessel A |
| 4 | end | Pressure equalisation vessel A receives oxygen via 15A from vessel B | Pressure equalisation. vessel B gives oxygen via 16B to vessel A |

Figure 4:
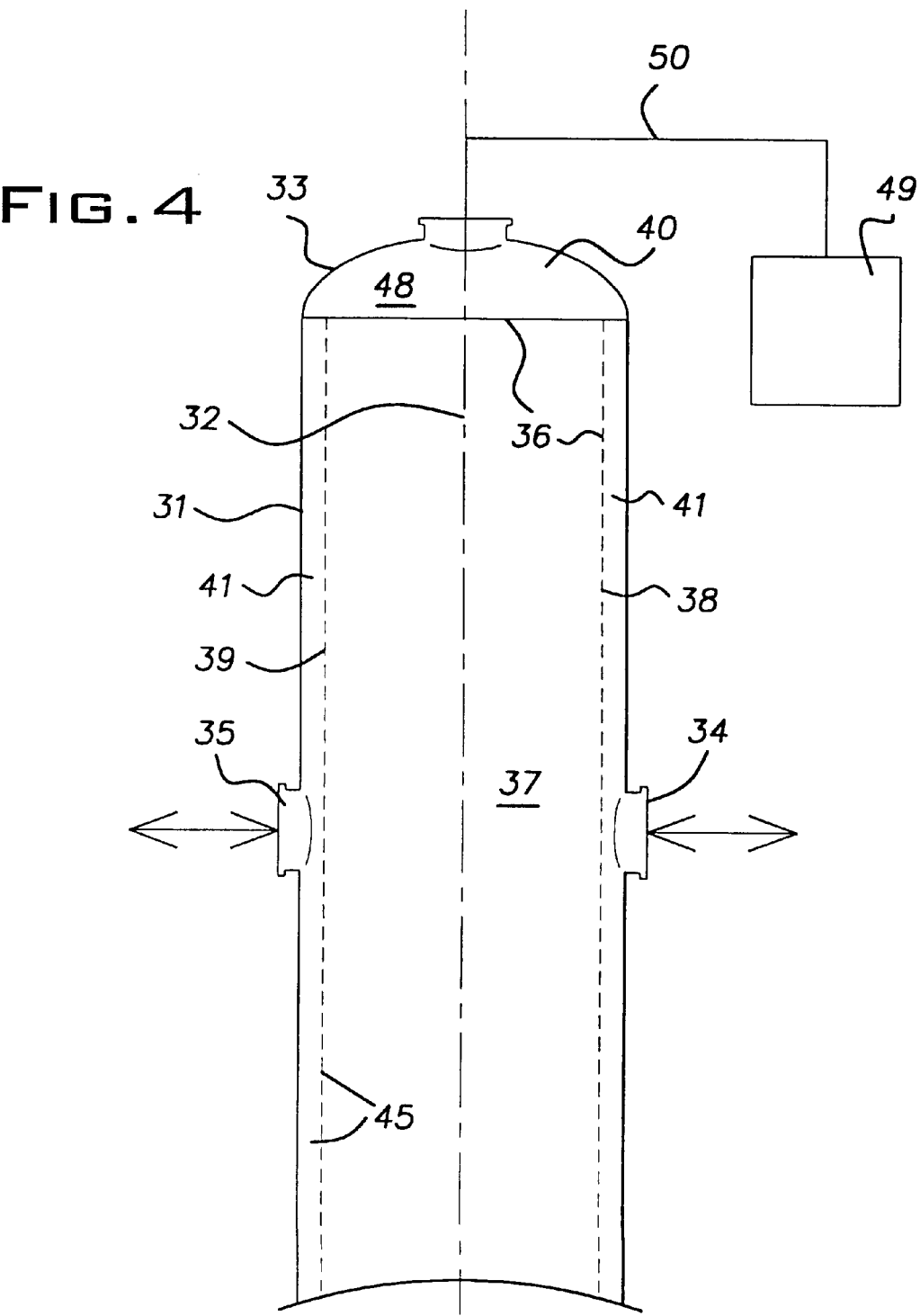
FIG. 4 is a vertical cross-section view of an adsorption vessel for the separation device disclosed in FIGS. 2 and 3.
Figure 5:
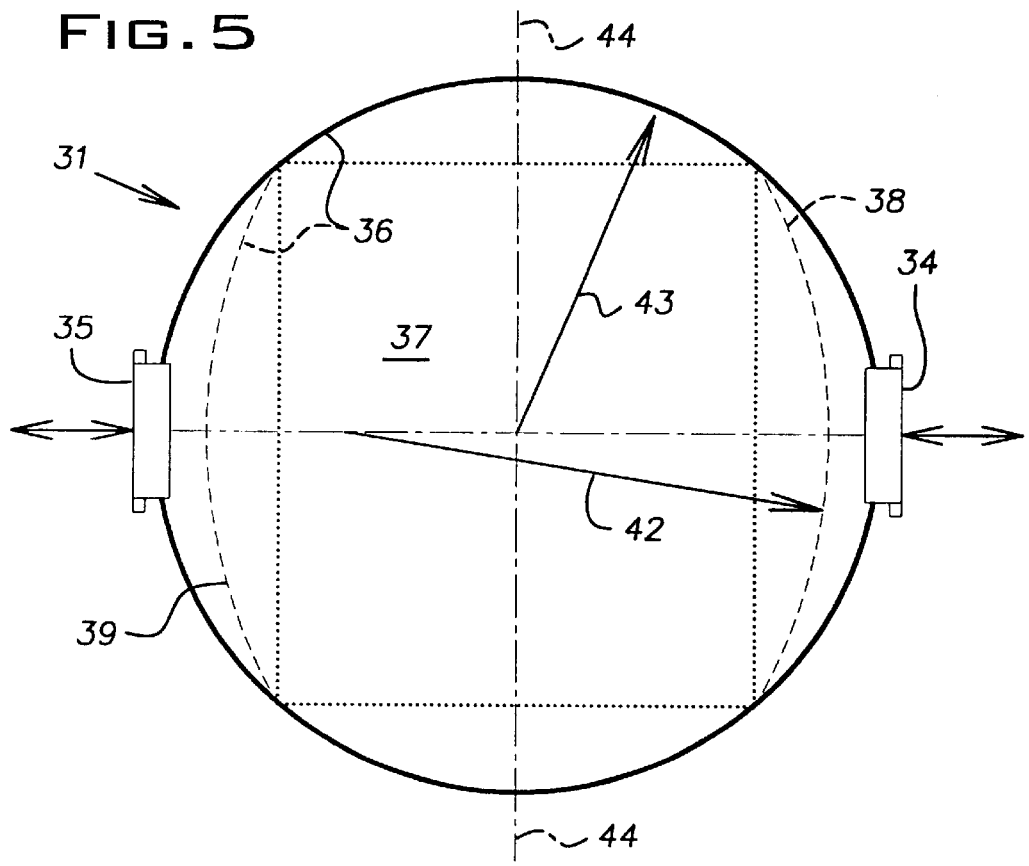
FIG. 5 is a horizontal cross-section view of the vessel in FIG. 4.

FIGS. 4 and 5 disclose by way of example a vessel 31 to be used in the first or second embodiment described above. The vessel 31 has an elongated, essentially circular cylindrical wall around a vertical centre axis 32, an upper end wall 33 and a lower end wall (not shown), which is essentially spherically curved and forms the base of the vessel 31. In the cylindrical wall of the vessel 31, there are provided a first passage 34, which may form the first passages 15A and 15B in the embodiments described above, and a second passage 35, which may form the second passages 16A and 16B in the embodiments described above and which is diametrically opposite to the first passage 34. An enclosure means 36 is provided in the vessel 31 to enclose an adsorbent 37 in the form of a bed of molecular sieve particles having a size of about 1–3 mm, such as zeolite. The enclosure means 36 is defined by a first and second enclosure panel 38 and 39, respectively, by the parts of the cylindrical wall of the vessel 31, which extend between said first and second enclosure panels 38, 39, by an upper end wall 40, and a lower end wall (not shown), which may be formed by said end wall of the vessel 31. The first and second enclosure panels 38, 39 are provided inside the first and second passage 34, 35, respectively, at a distance therefrom to provide a flow distribution space 41 therebetween and have an inner and outer surface extending parallel to the centre axis 32 along almost the total length of the vessel 31. The first and second enclosure panels 38, 39 are both perforated to permit fluid flow therethrough. Each enclosure panel 38, 39 is curved in one direction to a convex shape seen from the respective passage 34, 35. The curvature of each panet 38, 39 is such that it has an essentially circular cylindrical shape with a radius 42 of curvature being greater than the radius 43 of curvature of the cylindrical wall of the vessel 31. In the embodiment disclosed each enclosure panel 38, 39 has such a length that the distance between its lines of contact with the cylindrical wall corresponds to one side of a square inscribed in the cylindrical vessel 31, see FIG. 5. It should be noted that instead of the square shape a rectangle having two different side lengths may be inscribed in the cylindrical vessel 31. The relation between the radius 42 of the enclosure panel 38, 39 and the radius 43 of the cylindrical vessel wall should be greater than 1 and less than 5, preferably between 1.2 and 3, and more specifically between 1.5 and 2. This relation may lie outside these ranges if the square inscribed instead has the shape of a rectangle.

As may be seen from FIG. 5, the vessel 31 is symmetrically shaped with regard to a midplane 44. This means that both the first passage 34 and the second passage 35 may operate as an inlet passage and an outlet passage, respectively, during an adsorbing phase as well as during a regeneration phase.

Figure 6:
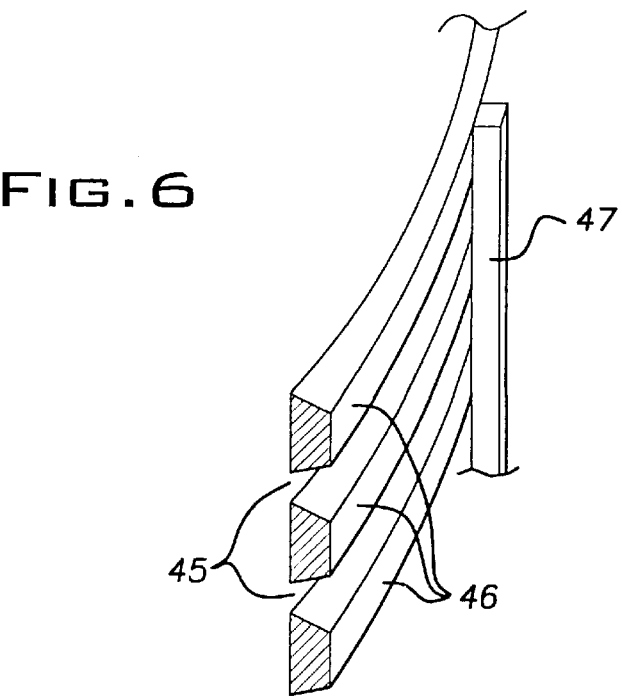
FIG. 6 is a vertical cross-section view of a part of an enclosure panel provided in the vessel disclosed in FIGS. 4 and 5.

The perforations 45 of the enclosure panels 38, 39 are shaped as elongated slits being essentially perpendicular to the centre axis 32 and extending along the total width of each enclosure panel 38, 39. The perforations may be formed by means of elongated metal bars 46 provided in parallel with each other and with a gap 45 between each bar 46, see FIG. 6. The metal bars 46 are curved with a radius corresponding to the radius 42 of curvature. In cross-section each bar 46 is converging from the surface facing the particulate material 37 to the surface facing the flow distribution space 41. Thus, the smallest distance between each bar 46 is adjacent the inner surface facing the adsorbent 37. It is clear that this distance must be smaller than the size of the particles of the adsorbent 37. The bars 46 are supported and kept in proper position by means of elongated support means 47, in the form of a small beam, preferably welded to the bars 46.

Between the upper end wall 33 of the vessel 31 and the upper end wall 40 of the enclosure means 36, there is a provided a closed space 48. The upper end wall 40 of the enclosure means 36 comprises a flexible membrane. The closed space 48 is connected to a pressure regulating means 49, schematically disclosed. via conduit means 50. Thus, by means of the pressure regulating means 49, the pressure in the closed space 48 may be regulated such that the particulate material within the enclosure means 36 is maintained in a substantially motionless, fixed position. This means that as long as the pressure in the closed space 48 is higher than the pressure within the enclosure means 36, i.e. the bed 37, the flow rate of the gas may be increased in comparison with the prior art, since the particles of the bed 37 are hindered to move and start to fluidize due to said pressure difference. Moreover, since the particulate material 37 is immovable and since the vessel 31 is symmetrically shaped with regard to the midplane 44, high flow rates may be permitted in both the flow directions.

The vessel 31 may function as described in the following example of separation of air. The air is introduced through the passage 34 and is distributed in the flow distribution space 41. From there the air is entering the bed 37 of adsorbent through the perforations in the convex enclosure panel 38. The air flows through the bed 37 such that the front of the gas flow is essentially plane when the flow passes the midplane 44. This means that the air is uniformly distributed to all parts of the bed 37 and all of the particles will be equally active in adsorbing nitrogen. The gas flow, from which a substantial part of the nitrogen has been removed, is the leaving the vessel 31 via the other enclosure panel 39, the manifold space 41 and the passage 35. When the bed of particulate material 37 may not adsorb more nitrogen, the process is reversed and the direction of the gas flow is changed, e.g. by means of a vacuum pump (not shown) connected to the passage 34. Due to the pressure decrease the nitrogen adsorbed will leave the bed 37 via the enclosure panel 38, the manifold space 41 and the passage 34.

The present invention is not limited to the embodiment disclosed above but may be varied or modified within the scope of the following claims. Although the above description refers to the separation of air to produce oxygen, it should be clear to the person skilled in the art that the process and device according to the present invention also may be used for the production of other gases, for instance nitrogen, carbon dioxide, argon, etc. Furthermore, the process and device according to the present invention may be used for removing humidity, or other vapours, from air or other gases.

What is claimed is:

1. A process for producing a gas from a gas mixture by means of at least a first separation vessel, said vessel having a first passage, a second passage, and a bed, said process comprising the steps of:
    (a) feeding the gas mixture into the bed via the first passage and discharging said gas from the bed via the second passage;
    (b) evacuating a rest gas from the bed via the first passage;
    (c) feeding the gas mixture into the bed via the second passage and discharging said gas from the bed via the first passage; and,
    (d) evacuating the rest gas from the bed via the second passage.

2. A process according to claim 1, wherein a second vessel having a first passage, a second passage, and a bed is provided, and wherein:
    step (a) also comprises evacuating the rest gas from the bed of the second vessel via the first passage of said second vessel;
    step (b) also comprises feeding the gas mixture to the bed of the second vessel via the second passage of the second vessel and discharging said gas from the bed of the second vessel via the first passage of the second vessel;
    step (c) also comprises evacuating the rest gas from the bed of the second vessel via the second passage of the second vessel; and step (d) also comprises feeding the gas mixture to the bed of the second vessel via the first passage of the second vessel and discharging said gas from the bed of the second vessel the its second passage of the second vessel.

3. A process according to claim 2, wherein, during an intermediate phase of steps (a) and (c), said gas discharged from the bed of the first vessel is partly transferred to the bed of the second vessel and, during an intermediate phase of steps (b) and (d), the gas discharged from the bed of the second vessel is partly transferred to the bed of the first vessel.

4. A process according to claim 3, wherein said intermediate phase of step (a) comprises transferring said gas from the bed of the first vessel via the second passage of the first bed to the bed of the second vessel the second passage of the second bed,
    said intermediate phase of step (b) comprises transferring said gas from the bed of the second vessel via the first passage of the second vessel to the bed of the first vessel via the first passage of the first vessel,
    said intermediate phase of step (c) comprises transferring said gas from the bed of the first vessel via the first passage of the first vessel to the bed of the second vessel via the first passage of the second vessel, and
    said intermediate phase of step (d) comprises transferring said gas from the bed of the second vessel via the second passage of the second vessel to the bed of the first vessel via the second passage of the first vessel.

5. A process according to claim 4, wherein each of the steps is terminated by an end phase comprising a pressure equalization between the first and second vessel.

6. A process according to claim 1, wherein the feeding of the gas mixture to the bed comprises adsorption of the rest gas by means of an adsorbent material contained in the bed.

7. A process according to claim 6, wherein the adsorbent material is zeolites.

8. A process according to claim 6, wherein the gas mixture is air, said gas is essentially oxygen and said rest gas is essentially nitrogen.

9. A process according to claim 1, wherein a temperature of the gas mixture to be fed to the separation vessel is regulated to maintain an optimal temperature in the bed.

10. A device for producing a gas containing at least one component from a gas mixture, said device comprising:
    a first vessel (A, 31) having a first passage (15A, 4), a second passage (16A, 35) and a separation bed (37);
    source means (10) for supplying the gas mixture to the bed of the first vessel (A, 31);
    receiving means (12) for receiving said gas from the bed of the first vessel (A, 31); and first conduit means (17A', 18A') for connecting the source means (10) to the bed (37) via the first passage (15A) and the bed, via the second passage (16A), to the receiving means (12);
    wherein second conduit means (17A", 18A') connect the source means (10) to the bed (37) via the second passage (16A) and the bed, via the first passage (15A), to the receiving means (12).

11. A device according to claim 10, further comprising second receiving means (14) for receiving a rest gas from the bed of the first vessel (A);
    third conduit means (19A') for connecting the bed of the first vessel (A), via the first passage (15A) of the first vessel, to the second receiving means (14); and,
    fourth conduit means (19A") for connecting the bed of the first vessel, via the second passage (16A) of the first vessel, to the second receiving means (14).

12. A device according to claim 11, further comprising valve means (V) for:
   activating the first conduit means (17A', 18A") during a first step of operation;
   activating the third conduit means (19A') during a second step of operation;
   activating the second conduit means (17A", 18A') during a third step of operation; and,
   activating the fourth conduit means (19A") during a fourth step of operation.

13. A device according to claim 12, further comprising a second separation vessel (B) having a first passage (15B), a second passage (16B) and a separation bed (37);
   fifth conduit means (17B", 18B') connecting the source means (10) to the bed of the second vessel (B) via the second passage (16B) of the second vessel and the bed of the second vessel (B), via the first passage (15B) of the second vessel, to the receiving means (12); and,
   sixth conduit means (17B', 18B") connecting the source means to the bed of the second vessel (B) via the first passage (15B) of the second vessel and the bed of the second vessel (B), via the second passage (16B), to the receiving means (12).

14. A device according to claim 13, further comprising seventh conduit means (19B') for connecting the bed of the second vessel (B), via the first passage (15B) of the second vessel, to the second receiving means (14); and,
   eighth conduit means (19B") for connecting the bed of the second vessel (B), via the second passage (16B) of the second vessel to the second receiving means (14).

15. A device according to claim 14, wherein the valve means (V) activates the first and seventh conduit means (17A', 18A"; 19B') during the first step of operation;
   activates the third and fifth conduit means (19A'; 17B", 18B') during the second step of operation;
   activates the second and eighth conduit means (17A", 18A'; 19B") during the third step of operation; and,
   activates the fourth and sixth conduit means (19A"; 17B', 18B") during the fourth step of operation.

16. A device according to claim 15, further comprising ninth conduit means (18A", 18B") connecting the first and second vessel (A, B) via the first vessel second passage (16A) and the second vessel second passage (16B);
   tenth conduit means (18A", 18B') connecting the first and second vessels (A, B) via first vessel second passage (16A) and the second vessel first passage (15B);
   eleventh conduit means (18A', 18B') connecting the first and second vessel (A, B) via the first vessel first passage (15A) and the second vessel first passage (15B); and,
   twelfth conduit means (18A', 18B") connecting the first and second vessel (A, B) via the first vessel first passage (15A) and the second vessel second passage (16B).

17. A device according to claim 16, wherein the valve means (V) is provided to activate the ninth to twelfth conduit means (18A", 18B"; 18A", 18B'; 18A', 18B'; 18A', 18A"), during an end phase of the first, second, third and fourth, respectively, steps of operation.

18. A device according to claim 17, wherein the valve means (V) is provided to cut off the first to eighth conduit means during a terminating period of the end phase of the first, second, third, and fourth steps of operation.

19. A device according to claim 11, wherein the second receiving means (14) comprises a vacuum pump device (13) provided to evacuate the rest gas from the bed (37) so that a relatively low pressure is reached in the bed.

20. A device according to claim 10, wherein the source means (10) comprises a pump device (11) to supply the gas mixture to the bed (37) such that a relatively high pressure is reached in the bed.

21. A device according to claim 10, wherein the source means (10) comprises a temperature regulating means (20) to regulate temperature of the gas mixture to be supplied to the bed (37).

22. A device according to claim 10, wherein the first and second passages (15A, 15B, 34; 16A, 16B, 36) and the separation bed (37) of the vessel (A, B, 31) are symmetrical relative to a midplane (44) of the vessel.

23. A device according to claim 10, wherein the vessel (A, B, 31) has an essentially circular cylindrical shape around a center axis (32), the first passage (34) is provided in the cylindrical wall of the vessel, the second passage (35) is provided in the cylindrical wall of the vessel on a diametrically opposite part thereof, the bed (37) is enclosed by enclosure means (36) comprising a first and second enclosure panel (38, 39) provided inside the first and second passage, respectively, at a distance therefrom to define a flow distribution space (41) therebetween and being perforated (45) to permit fluid flow therethrough, and wherein each enclosure panel (38, 39) has an outer surface which is essentially parallel with the center axis (32) and convex as seen from the respective passage (34, 35; 15A, 16A; 15B, 16B).

24. A device according to claim 23, wherein each of said convex panels (38, 39) has an essentially circular cylindrical shape with a radius of curvature (42) which is greater than a radius of curvature (43) of the cylindrical wall of the vessel.

25. A device according to claim 23, wherein the enclosure means (36) comprises two enclosure walls each formed by a part of the cylindrical wall of the vessel (A, B, 31) and extending between said first and second enclosure panels (38, 39).

26. A device according to claim 23, wherein the enclosure means (36) comprises a flexible end wall (40) adapted to be forced against the bed (37) of particulate material in order to maintain said material in a substantially motionless position.

27. A device according to claim 23, wherein the center axis (32) is directed in a substantially vertical orientation.

28. A device according to claim 10, wherein the bed (37) comprises an absorbent in the form of a particulate material.

* * * * *

UNITED STATES PATENT AND TRADEMARK OFFICE
CERTIFICATE OF CORRECTION

PATENT NO. : 6,068,679
DATED : May 30, 2000
INVENTOR(S) : Zheng

It is certified that error appears in the above-identified patent and that said Letters Patent is hereby corrected as shown below:

Column 1, line 51, after "made at" insert --a--.

Column 3, line 37, after "obtained" insert --by--.

Column 6, line 43, delete " 19A" " and insert --19A'--.

Column 12, claim 10, line 52, delete "(17A, 18A')" and insert --(17A', 18A")--.

Signed and Sealed this

Third Day of April, 2001

Attest:

NICHOLAS P. GODICI

*Attesting Officer*  *Acting Director of the United States Patent and Trademark Office*